(12) United States Patent
Shiono

(10) Patent No.: US 9,199,587 B2
(45) Date of Patent: Dec. 1, 2015

(54) GUIDANCE DEVICE, GUIDANCE METHOD

(75) Inventor: Tsuguhiro Shiono, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/125,440

(22) PCT Filed: Jun. 14, 2011

(86) PCT No.: PCT/JP2011/063598
§ 371 (c)(1),
(2), (4) Date: Dec. 11, 2013

(87) PCT Pub. No.: WO2012/172644
PCT Pub. Date: Dec. 20, 2012

(65) Prior Publication Data
US 2014/0107902 A1    Apr. 17, 2014

(51) Int. Cl.
*B60R 16/02* (2006.01)
*B60R 16/023* (2006.01)
(Continued)

(52) U.S. Cl.
CPC ............. *B60R 16/0232* (2013.01); *B60R 16/02* (2013.01); *B60W 50/14* (2013.01); *F02N 11/0803* (2013.01); *F02N 11/0814* (2013.01); *B60K 2028/003* (2013.01);
(Continued)

(58) Field of Classification Search
CPC .. B60R 16/0232; B60R 16/02; G08B 21/187; F02N 11/0803; F02N 11/0814; B60W 50/14
USPC ........................................................ 701/99
See application file for complete search history.

(56) References Cited

U.S. PATENT DOCUMENTS 3,788,422 A * 1/1974 Bowler .......................... 180/287
4,328,547 A * 5/1982 Barman et al. ................. 701/112
(Continued)

FOREIGN PATENT DOCUMENTS

DE    10040094 A1 * 4/2001    ............. F02D 17/00
DE    10211464 A1 * 9/2003    ............. F02N 17/00
(Continued)

OTHER PUBLICATIONS

JPO machine translation of JP 2010-65573 (original JP document published Mar. 10, 2010).*
(Continued)

*Primary Examiner* — Behrang Badii
*Assistant Examiner* — David Testardi
(74) *Attorney, Agent, or Firm* — Finnegan, Henderson, Farabow, Garrett & Dunner, LLP

(57) ABSTRACT

A guidance device for teaching a vehicle operating method, includes an operation receiving unit configured to receive an operation of starting or stopping an engine, or to receive an operation of starting or stopping a travelling system including at least an electronic motor; a power control unit configured to control a defined power mode according to the operation received by the operation receiving unit and a state of a vehicle; a stop detecting unit configured to detect stopping of the engine or stopping of the travelling system while the vehicle is travelling; a stop factor determining unit configured to determine whether a factor of the stopping of the engine or the stopping of the travelling system is a man-caused operation based on the power mode; and a guidance unit configured to change a guidance content according to whether the factor is the man-caused operation.

5 Claims, 11 Drawing Sheets

(51) Int. Cl.
*B60W 50/14* (2012.01)
*F02N 11/08* (2006.01)
*F02N 11/10* (2006.01)
*B60W 50/029* (2012.01)
*B60K 28/00* (2006.01)

(52) U.S. Cl.
CPC ....... *B60K 2028/006* (2013.01); *B60W 50/029* (2013.01); *B60W 2540/06* (2013.01); *F02N 11/101* (2013.01); *F02N 2200/102* (2013.01); *Y02T 10/48* (2013.01)

(56) References Cited

U.S. PATENT DOCUMENTS

| | | | |
|---|---|---|---|
| 4,485,772 A * | 12/1984 | Uchida et al. | 123/179.4 |
| 4,632,079 A * | 12/1986 | Panizza et al. | 123/179.3 |
| 4,878,042 A * | 10/1989 | Eggiman et al. | 340/439 |
| 6,371,889 B1 * | 4/2002 | Kuroda et al. | 477/181 |
| 6,956,470 B1 * | 10/2005 | Heise et al. | 340/438 |
| 6,982,632 B2 * | 1/2006 | Nagasaka et al. | 340/426.3 |
| 7,091,839 B2 * | 8/2006 | Situ et al. | 340/438 |
| 7,143,732 B2 * | 12/2006 | Watanabe et al. | 123/179.4 |
| 7,210,443 B2 * | 5/2007 | Shimokawa et al. | 123/179.4 |
| 7,683,503 B2 * | 3/2010 | Yamaguchi | 307/10.7 |
| 2004/0214689 A1* | 10/2004 | Kaneko | 477/203 |

FOREIGN PATENT DOCUMENTS

| | | | | |
|---|---|---|---|---|
| DE | 102007030524 A1 * | 12/2008 | | B60K 35/00 |
| DE | 102008052839 A1 * | 5/2010 | | |
| FR | 2764337 A1 * | 12/1998 | | F02D 41/22 |
| GB | 2300705 A * | 11/1996 | | B60Q 1/52 |
| JP | 58162743 A * | 9/1983 | | F02D 29/02 |
| JP | 62142862 A * | 6/1987 | | F02P 11/04 |
| JP | 07229437 A * | 8/1995 | | F02D 41/06 |
| JP | 2002187479 A * | 7/2002 | | B60Q 1/52 |
| JP | 2003-89332 | 3/2003 | | |
| JP | 2006077592 A * | 3/2006 | | |
| JP | 2006-290303 | 10/2006 | | |
| JP | 2007-23919 | 2/2007 | | |
| JP | 2007196733 A * | 8/2007 | | |
| JP | 2009002236 A * | 1/2009 | | |
| JP | 2009243474 A * | 10/2009 | | |
| JP | 2010065573 A * | 3/2010 | | |
| KR | 1020040065870 A * | 7/2004 | | |
| KR | 1020060067558 A1 * | 6/2006 | | |

OTHER PUBLICATIONS

Google Translation of DE 10211464 A1 (original DE document published Sep. 25, 2003).*
KIPO machine translation of KR 1020040065870 (original KR document published Jul. 23, 2004).*
KIPO machine translation of KR 102006067558 (original KR document published Jun. 20, 2006).*
"Car Access System", BMW, Nov. 2001, 25 pages, downloaded from https://www.bimmerfest.com/forums/attachment.php?attachmentid=350110&d=1353377936.*
2011 Honda CR-Z Online Reference Owner's Manual, Copyright 2010 American Honda Moror Co., pp. 1, 191, 224-229.*
InsightCentral.net Encyclopedia article, "Idle Stop Mode", Copyright 2008 InsightCentral.net, 2 pages.*
New York Times "Wheels" blog, "Stalling Problems on Toyota Corolla and Matrixes Leads to Investigation", Dec. 7, 2009, 2 pages.*
Write.com forum post, "The use of whether/or", last replied Apr. 18, 2012, 2 pages.*

* cited by examiner

GUIDANCE DEVICE, GUIDANCE METHOD

CROSS-REFERENCE TO RELATED APPLICATIONS

This application is a national phase application of International Application No. PCT/JP2011/063598, filed Jun. 14, 2011, the content of which is incorporated herein by reference.

TECHNICAL FIELD

The present invention is related to a guidance device for teaching a vehicle operating method, and particularly to a guidance device for teaching a method of starting a drive force.

BACKGROUND ART

An engine failure may occur while a vehicle, which is powered by an internal-combustion engine, is travelling. Furthermore, in a vehicle (EV) powered by an electric motor or a vehicle (HV) partially powered by an electric motor, a Ready-OFF state may occur, where the drive force cannot be transmitted to the wheels while the vehicle is travelling. These circumstances occur, for example, when the vehicle runs out of gas, when an emergency stop operation is performed, or when an external operation is received.

When an engine failure occurs or when a Ready-OFF state occurs while the vehicle is traveling, generally, an evacuating operation is preferable, such as parking the vehicle on a road shoulder while travelling by inertia. However, there are cases where it is difficult for the driver to immediately correctly recognize the state of the vehicle. For this reason, there is conventionally known a guidance device for teaching the method of operating a vehicle (see, for example, Patent Document 1). Patent Document 1 discloses a vehicle guidance device for monitoring the state of electrical appliances in the vehicle, sending the driver an emergency treatment method under a condition that the monitor data exceeds a threshold, and providing information for causing the vehicle to safely stop or travel.

Incidentally, when an engine failure occurs or when a Ready-OFF state occurs because the driver performed an emergency stop operation, the vehicle can immediately recover a state where travelling is possible. However, the button for the emergency stop operation is disposed at a position where the button can be operated from the driver's seat, and therefore the button can be unintentionally operated, in cases other than when the driver intentionally performs an emergency stop operation. However, the driver who has unintentionally operated the button cannot understand why an engine failure has occurred or why a Ready-OFF state has occurred, and cannot perform an operation for recovering the state where travelling is possible. Even when an engine failure has occurred or a Ready-OFF state has occurred in a similar manner as described above, it is preferable to provide the driver with guidance specifically for recovering the state where travelling is possible in a case where an emergency stop operation has been performed. However, there is a problem that the vehicle guidance device described in Patent Document 1 is only for monitoring monitor data, and does not consider a case where an emergency stop operation has been performed unintentionally.

[Patent Document 1] Japanese Laid-open Patent Publication No. 2003-089332

DISCLOSURE OF INVENTION

Problem to be Solved by Invention

In view of the above problem, the object of the present invention is to provide a guidance device that can teach appropriate guidance in a case where travelling becomes difficult because of an operation by the driver.

Means to Solve the Problem

The present invention provides a guidance device for teaching a vehicle operating method, the guidance device including an operation receiving unit configured to receive an operation of starting or stopping an engine, or to receive an operation of starting or stopping a travelling system including at least an electronic motor; a power control unit configured to control a defined power mode according to the operation received by the operation receiving unit and a state of a vehicle; a stop detecting unit configured to detect stopping of the engine or stopping of the traveling system while the vehicle is travelling; a stop factor determining unit configured to determine whether a factor of the stopping of the engine or the stopping of the travelling system is a man-caused operation based on the power mode; and a guidance unit configured to change a guidance content according to whether the factor is the man-caused operation.

Effects of the Invention

A guidance device can be provided, which can teach appropriate guidance when it becomes difficult to travel becomes of the driver's operation.

Figure 1:
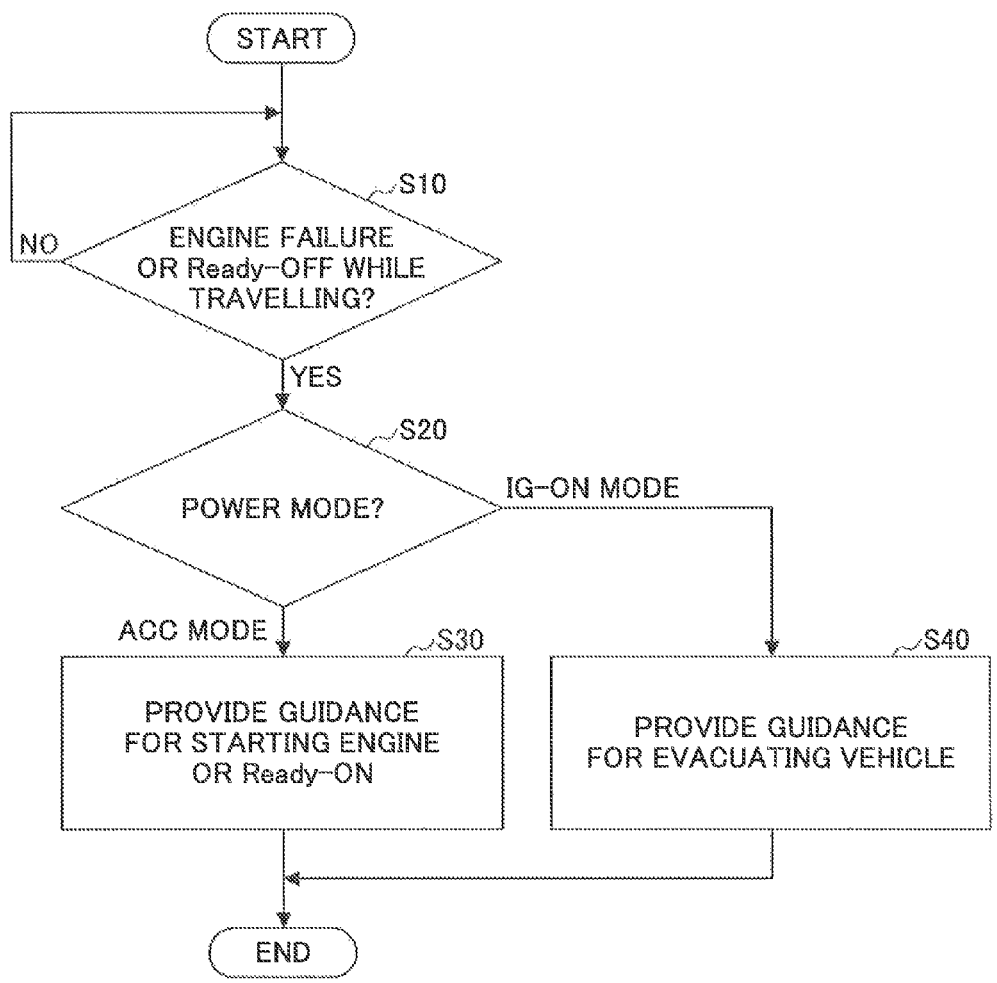
FIG. 1 is an example of a flowchart for describing the outline of operational procedures of a guidance device.

DESCRIPTION OF REFERENCE SYMBOLS 11 engine switch
14 power ECU
15 ACC relay
16 IG1 relay
17 IG2 relay
18 meter ECU
19 meter panel
21 speaker 24 engine ECU
25 engine
27 electronic key
30 liquid crystal display unit

BEST MODE FOR CARRYING OUT THE INVENTION

In the following, a mode for carrying out the present invention is described with reference to drawings.

FIG. 1 is an example of a flowchart for describing the outline of operational procedures of a guidance device. While the vehicle is travelling, the guidance device detects a state where the vehicle cannot travel (YES in S10). A state where the vehicle cannot travel means an engine failure in a case of a vehicle powered by an internal-combustion engine, and means a Ready-OFF state in a case of vehicle (EV) powered by an electric motor or a vehicle (HV) partially powered by an electric motor.

In a state where the vehicle cannot travel, the guidance device determines whether the power mode is an ACC mode or an IG-ON mode (S20). As described below, in a case where an engine failure or a Ready-OFF state occurs while the vehicle is travelling, the power mode can only be either the ACC mode or the IG-ON mode.

When the power mode is the ACC mode, it means that an emergency stop operation has been performed, and therefore the guidance device provides a guidance content, such as, for example, a "guidance for starting the engine or causing a Ready-ON state" (S30).

Meanwhile, when the power mode is the IG-ON mode, it means that an abnormality has occurred in the vehicle such as running out of gas, and therefore the guidance device provides a guidance content, such as, for example, a "guidance for evacuating the vehicle" (S40).

As described above, when an emergency stop operation is performed, by providing "guidance for starting the engine or causing a Ready-ON state", in a case where a man-caused operation is performed, such as where the driver has unintentionally performed an emergency stop operation, the driver can correctly understand the circumstances and respond appropriately.

First Embodiment

Figure 2:
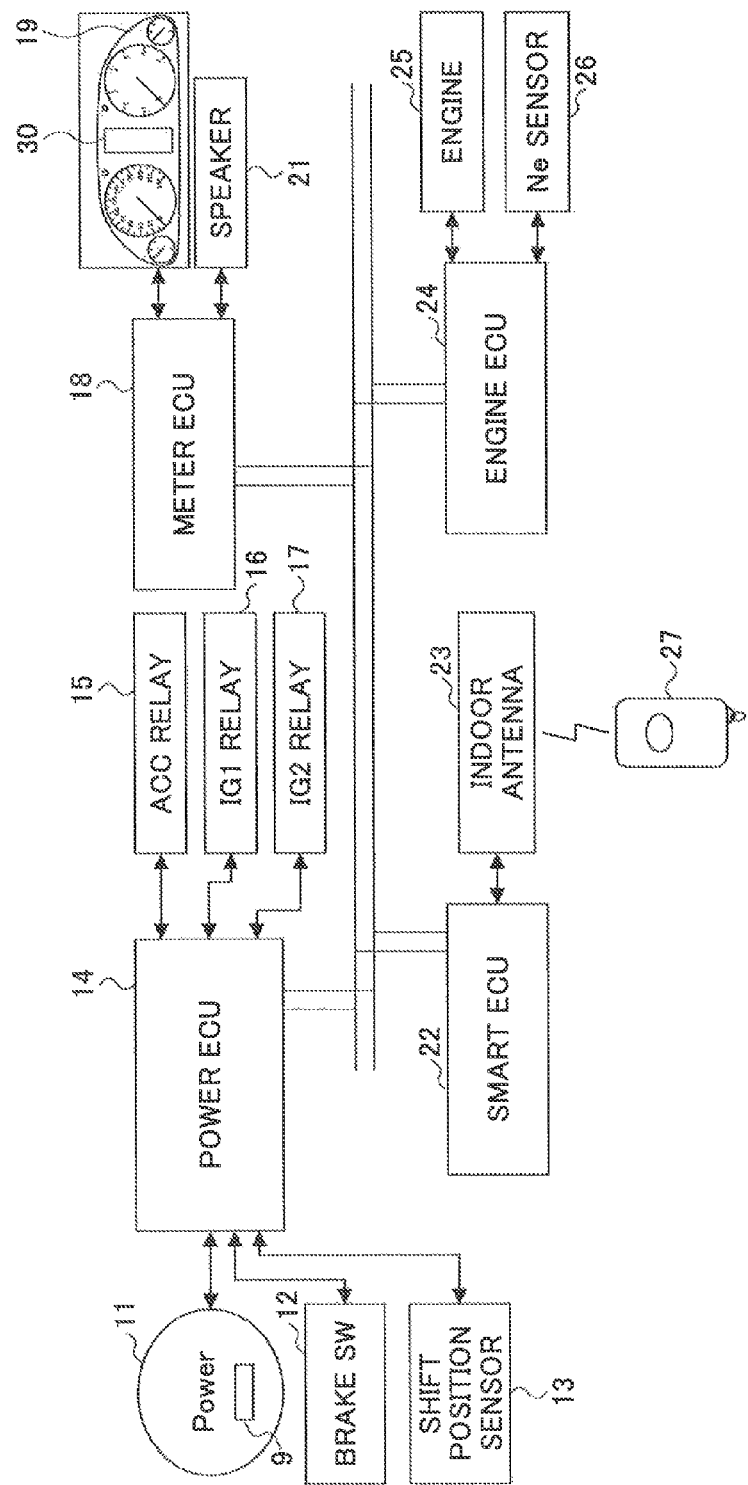
FIG. 2 illustrates a schematic configuration of a guidance device.

FIG. 2 illustrates a schematic configuration of a guidance device. The guidance device includes a power ECU (electronic control unit) 14 connected via an on-vehicle network such as a CAN (Controller Area Network), a meter ECU 18, an engine ECU 24, a smart engine 22 etc. To the power ECU 14, an engine switch 11, a brake SW 12, a shift position sensor 13, an ACC relay 15, an IG1 relay 16, and an IG2 relay 17 are connected; to the meter ECU 18, a meter panel 19 is connected; to the engine ECU 24, an engine (various sensors and actuators for controlling the engine) 25 and an Ne sensor 26 are connected; and to the smart ECU 22, an indoor antenna 23 is connected. Note that each ECU is a configuration example of a guidance device, and an ECU other than these ECUs may be further included, or only ECUs other than these ECUs may be included.

Figure 8:
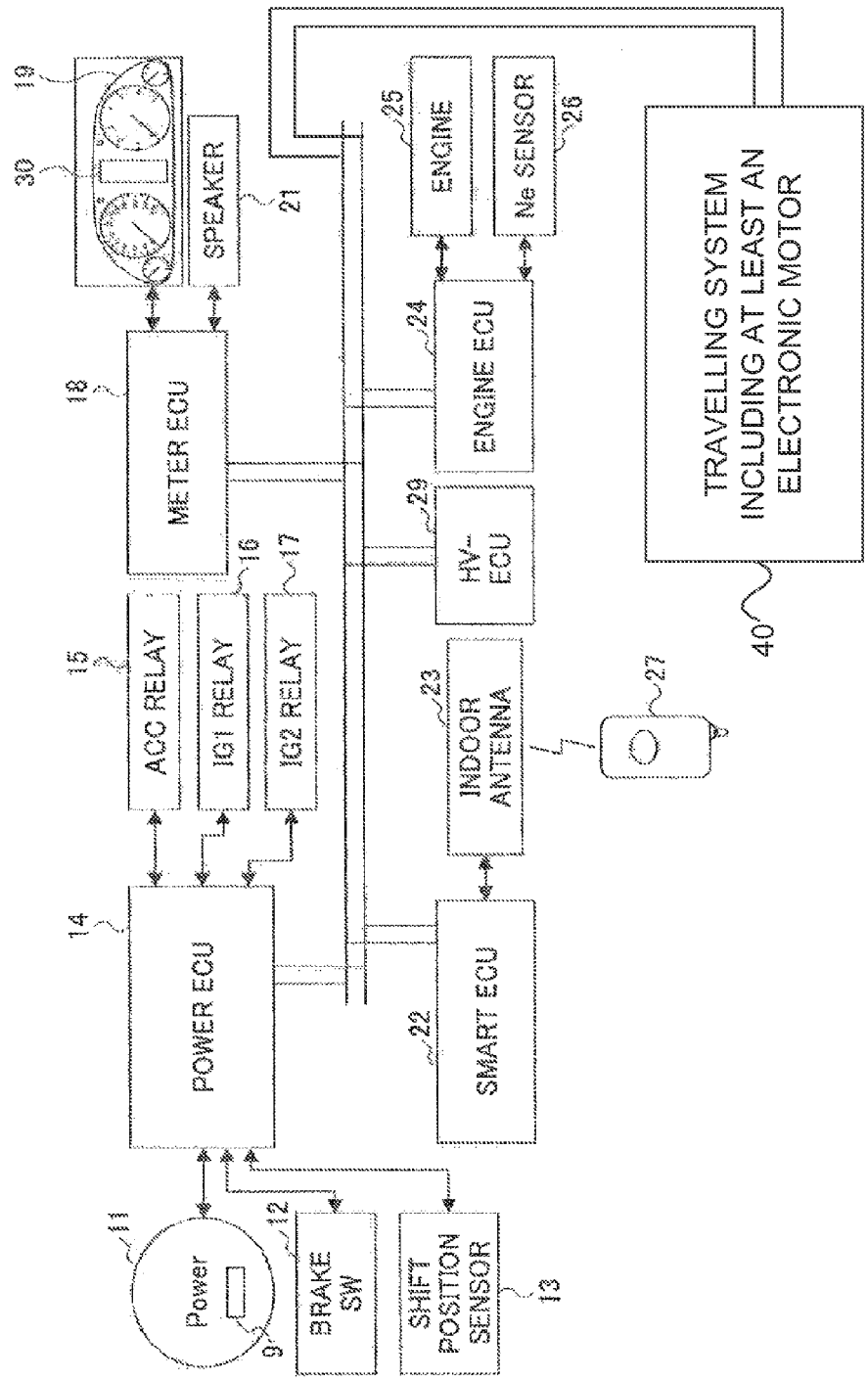
FIG. 8 illustrates a schematic configuration of a guidance device (second embodiment)

The engine switch 11 is an example of an operation receiving unit or operation receiver configured to receive an operation of starting or stopping an engine, or to receive an operation of starting or stopping a travelling system including at least an electronic motor (shown in FIG. 8). The engine switch 11 is a momentary switch that is a press button switch, and a bias force is applied according to an elastic body from the inside to an initial position direction. That is to say, when a passenger (hereinafter, simply referred to as a "driver") presses the engine switch 11, the engine switch 11 is turned on, and when the driver parts his finger away from the engine switch 11, the engine switch 11 returns to the initial position according to the bias force of the elastic body built in the engine switch 11, and the engine switch 11 is turned off. Therefore, only while the driver is pressing the engine switch 11, on-signals are output from the engine switch 11 to the power ECU 14.

Furthermore, the engine switch 11 includes an indicator lamp 9. The indicator lamp 9 can notify whether the engine can be started by the color of its light. For example, when the engine can be started, the indicator lamp 9 emits a green light (the power mode may any one of an OFF mode, an ACC mode, or an IG-ON mode); and when the engine cannot be started, the indicator lamp 9 is extinguished when the power mode is in the OFF mode and the indicator lamp 9 emits an umber light when the power mode is in the ACC mode or the IG-ON mode.

Furthermore, the brake SW 12 is a switch that is turned on when the brake pedal is pushed down from the initial position, and that is turned off when the pushing force is reduced and the brake pedal returns to the initial position. Therefore, only while the driver is pushing down the brake pedal, on-signals are output from the brake SW 12 to the power ECU 14. The shift position sensor 13 is a sensor for detecting the position of the shift lever (P, N, D, 1, 2, R, etc.).

The ACC relay 15 is a relay for turning on or off a power feeding line between first devices referred to as "accessory devices" (audio devices, navigation, interior light, etc.) and the battery. The IG1 relay 16 is a relay for turning on or off a power feeding line between devices unrelated to starting the engine (meter system, wiper, etc.) and the battery. The IG2 relay 17 is a relay for turning on or off a power feeding line between second devices necessary for starting the engine (ignition coil, injector, etc.) and the battery.

In the meter panel 19, a speed meter, a tachometer, a fuel meter, a water temperature meter, a liquid crystal display unit 30, etc., are disposed. In the present embodiment, a guidance is displayed on the liquid crystal display unit 30; however, the guidance may be displayed on a HUD (Head Up Display), or may be displayed on the liquid crystal display unit 30 of a center cluster. Furthermore, the guidance may be output as a sound message from a speaker 21.

The engine 25 is an internal-combustion engine for mixing air and fuel and compressing, combusting, expanding, and exhausting this mixture, and the type of fuel (gasoline, diesel oil, bioethanol, etc.), the number of cycles, the number of cylinders, the method (reciprocal type, rotary engine, a diesel engine without ignition, etc.), etc., are not, limited. The Ne sensor 26 is a sensor for notifying the engine revolution speed to the engine ECU 24, and is referred to as a "crank angle sensor".

The smart ECU 22 periodically emits request radiowaves from the indoor antenna 23, and determines whether authentication of an electronic key 27 is successful depending on whether an ID included in the response key radiowave sent by the electronic key 27 in response matches an ID registered in advance. When the authentication is successful, this is notified to the power ECU 14, and therefore the engine ECU 24 is allowed to start the engine.

Figure 3:
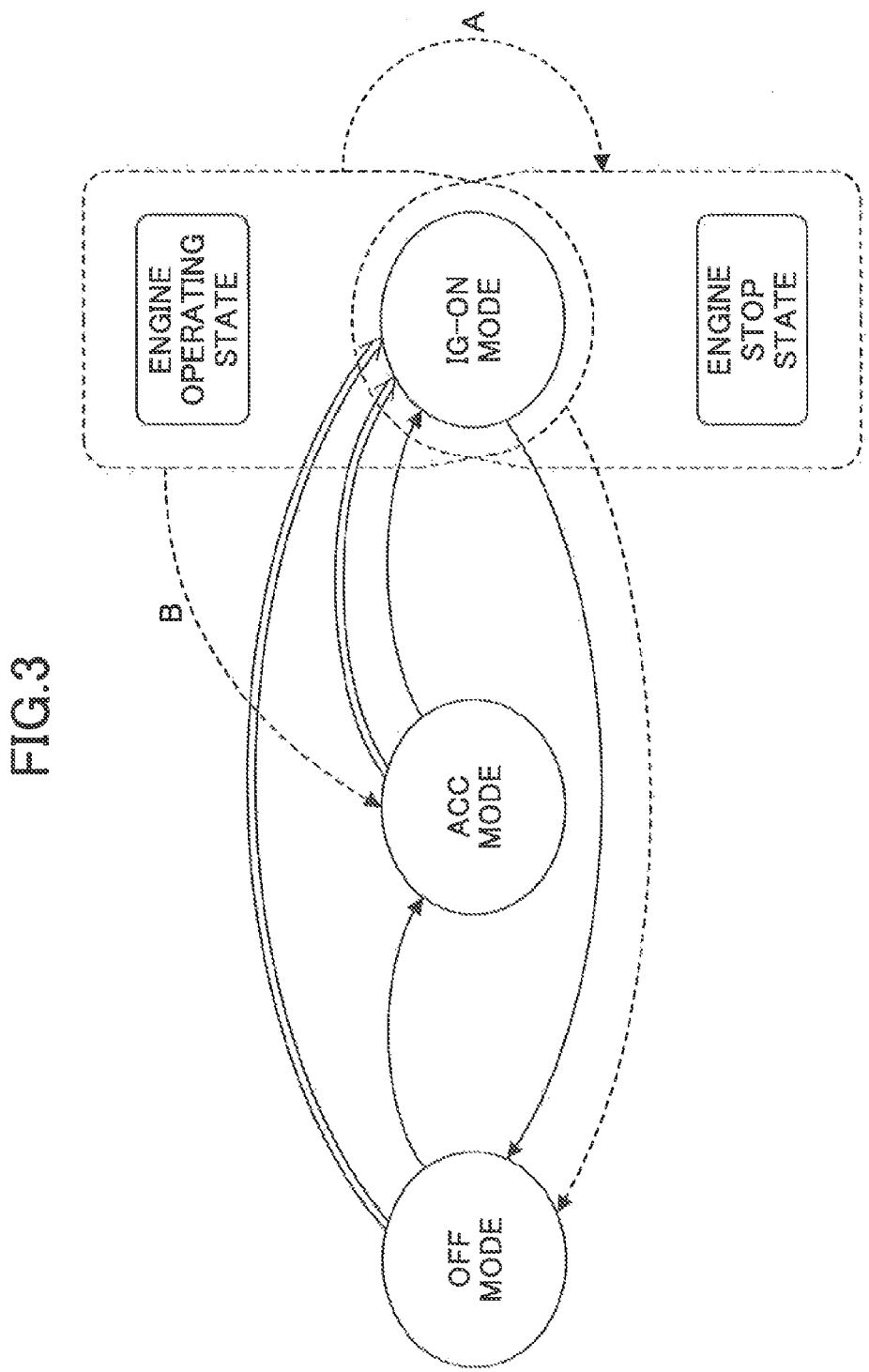
FIG. 3 illustrates examples of states of the power modes.

FIG. 3 illustrates examples of the power modes. As the power mode, there is an OFF mode, an ACC mode, and an IG-ON mode. An "engine operating state" and an "engine stop state" are not power modes, but are illustrated as a matter of description.

The OFF mode is a power mode in which the minimum requisite power for functions necessary for starting the engine and functions for security such as the power ECU 14 and the smart ECU 22, is supplied to the minimum requisite devices, and power supply to most of the devices is blocked. The ACC models a power mode in which the ACC relay 15 is turned on. The IG-ON mode is a power mode in which the ACC relay 15, the IG1 relay 16, and the IG2 relay 17 are turned on, and power is supplied to all devices necessary for the vehicle to travel. More specifically, in the IG-ON mode, when starting the engine, in order to secure power, the power ECU 14 turns on the IG1 relay 16 and the IG2 relay 17, and turns off the ACC relay 15. When the engine is completely exploded (or when the starting of the engine is unsuccessful), a notification is received from the engine ECU 24, and the power ECU 14 turns on the ACC relay 15, the IG1 relay 16, and the IG2 relay 17 (returns to the IG-ON mode). Note that the "engine operating state" is a state where the engine is completely exploded and the "engine stop state" is a state where the engine is stopped.

Transition of Power Mode when Engine is not Started

When the brake pedal is not pushed down, the power mode shifts every time the engine switch 11 is pressed.
First time: OFF mode→ACC mode
Second time: ACC mode→IG-ON mode
Third time: IG-ON mode→OFF mode Transition of Power Mode when Engine is Started When the brake pedal is pushed down (the shift position is recommended to be P or N), the power mode turns into an IG on state from any power mode when the engine switch 11 is pressed once. Furthermore, by turning on an ST relay that is not shown, the power ECU 14 rotates the start motor and starts the engine.
OFF mode→IG-ON mode
ACC mode→IG-ON mode When the starting of the engine is successful, the power mode shifts from the IG-ON mode to the engine operating state.

Transition of Power Mode when Engine is Stopped

In a case where the shift position is P and the vehicle is in a stooped state, regardless of whether the brake pedal is pushed down, the power mode becomes the OFF mode as the engine, switch 11 is pressed once. When this condition is satisfied, the power ECU 14 turns off the ACC relay 15, the IG1 relay 16, and the IG2 relay 17, and therefore the operating state of the engine cannot be maintained and the engine stops.
IG-ON mode (engine operating state)→OFF mode Note that when the shift position is other than P, even when the vehicle is in a stopped state, the power mode only becomes the ACC mode as the engine switch 11 is pressed once (when the shift position is other than P, the power ECU 14 keeps the ACC relay 15 on and turns off the IG1 relay 16 and the IG2 relay 17). In this case also, the operating state of the engine cannot be maintained and the engine stops.

Then, while the vehicle is travelling, when it is detected that the engine switch 11 is pressed for more than a predetermined time length (for example, three seconds or more), the power ECU 14 keeps the ACC relay 15 on and turns off the IG1 relay 16 and the 102 relay 17. Therefore, the power mode becomes the ACC mode (transition of B in figure). In this case also, the operating state of the engine cannot be maintained and the engine stops.
Long press (while travelling): IG-ON mode (engine operating state)→ACC mode Meanwhile, when an engine failure occurs while the vehicle is traveling without the driver's "emergency stop operation", the power ECU 14 has not shifted the power mode, and therefore the power mode is maintained at the IG-ON mode (transition of A in the figure).

As described above, when the vehicle is travelling, the power mode shifts from the IG-ON mode to the ACC mode only when the driver presses the engine switch 11 for more than a predetermined time length while the vehicle is travelling, so based on this, it can be detected that the engine failure has occurred due to the driver's operation. In the following, the operation where the driver presses the engine switch 11 for more than a predetermined time length is referred to as an emergency stop operation. Note that the emergency stop operation may be an operation performed by intermittently pressing the engine switch 11 more than a predetermined number of times (for example, three times), and one or more emergency stop operations are defined in advance according to the vehicle. Intermittently pressing the engine switch 11 means, for example, that the driver presses the engine switch 11 more than a predetermined number of times within a predetermined length of time (for example, 1 to 3 seconds).

In the Case of a Mechanical Key

FIG. 1 illustrates a guidance device in which the power mode is switched by pressing the engine switch 11; however, the guidance device may be similarly constituted in a case where the power mode is switched by operating a mechanical key.

Figure 4:
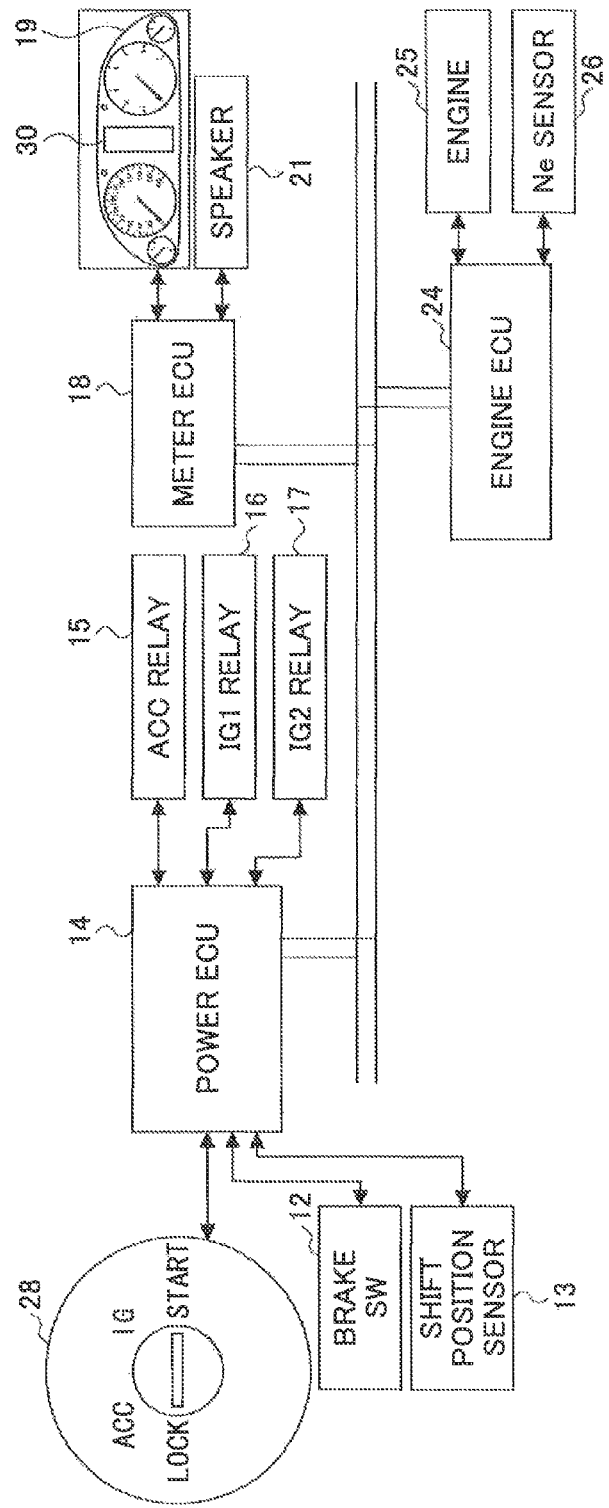
FIG. 4 illustrates another example of a schematic configuration of a guidance device.

FIG. 4 illustrates another example of a schematic configuration of a guidance device. Descriptions of elements in FIG. 4 that are the same as those of FIG. 2 are omitted. The guidance device of FIG. 4 does not include the smart ECU 22, and furthermore, a key cylinder 28 is illustrated instead of the engine switch 11. The key cylinder 28 includes rotation positions of a LOCK position, an ACC position, an IG position, and a START position. When the driver inserts the mechanical key in the key cylinder 28 and rotates the mechanical key to the rotation positions of the cylinder, the key cylinder 28 outputs a Hi signal to the power ECU 14 according to the rotation position.

Note that unless the driver applies a force for maintaining the mechanical key at the START position, the mechanical key is biased to return to the IG position. Furthermore, when the shift position is other than P, the driver can only rotate the mechanical key to the ACC position from the IG position. This is because the key cylinder 28 has a lock mechanism in accordance with the power mode.

In the guidance device including the key cylinder 28, the rotation positions of the mechanical key and the power modes correspond to each other as follows.
LOCK position: OFF mode
ACC position: ACC mode
IG position: IG-ON mode In the OFF mode, the ACC relay 15, the IG1 relay 16, and the IG2 relay 17 are turned off, in the ACC mode, only the ACC relay 15 is turned on, and in the IG-ON mode, the ACC relay 15, the IG1 relay 16, and the IG2 relay 17 are turned on.

Transition of Power Mode when Engine is Started

Then, when the driver rotates the mechanical key to the START position in a state where the driver is pushing down the brake pedal, only during this time, the power ECU 14 turns off the ACC relay 15 and the IG2 relay 17 and turns on only the IG1 relay 16, and turns on the ST relay. By turning on the ST relay, the start motor rotates and the engine is started. If the engine has completely exploded when the mechanical key is returned to the IG position from the START position by the bias force, the power modes becomes the IG-ON mode (engine operating state).

IG position→START position→IG position: the IG-ON mode (engine operating state)

The mechanical key always passes the IG position and therefore the positions are described as above; however, the engine can be started from the LOCK position and from the ACC position.

Transition of Power Mode when Engine is Stopped

In a case where the shift position is P and the vehicle is in a stopped state, regardless of whether the brake pedal is pushed down, the power mode becomes the OFF mode when the mechanical key is rotated to the LOCK position. The power ECU 14 turns off the ACC relay 15, the IG1 relay 16, and the IG2 relay 17, and therefore the operating state of the engine cannot be maintained and the engine stops.

IG position→LOCK position: IG-ON mode (engine operating state)→OFF mode

Note that when the shift position is other than P as described above, the driver can only rotate the mechanical key to the ACC position, and therefore the power mode becomes the ACC mode the power ECU 14 keeps the ACC relay 15 on, and turns off the IG1 relay 16 and the IG2 relay 17). In this case also, the operating state of the engine cannot be maintained and the engine stops.

IG position→ACC position: IG-ON mode (engine operating state)→ACC mode

When the vehicle is travelling (the shift position is other than P such as D, or a lock mechanism operates while travelling), the mechanical key can only be rotated to the ACC position, and therefore the power mode becomes the ACC mode. In the case of a mechanical key, the operation of IG position→ACC position while the vehicle is traveling, is the emergency stop operation. The power ECU 14 keeps the ACC relay 15 on and turns off the IG1 relay 16 and the IG2 relay 17. In this case also, the operating state of the engine cannot be maintained and the engine stops.

IG position→ACC position (travelling): IG-ON mode (engine operating state)→ACC mode Meanwhile, when an engine failure occurs without the driver's emergency stop operation, the power ECU 14 has not shifted the power mode, and therefore the power mode is maintained at the IG-ON mode.

As described above, when the vehicle is travelling, the power mode shifts from the IG-ON mode to the ACC mode only when the mechanical key is rotated to the ACC position while the vehicle is travelling, so based on this, it can be detected that the engine failure has occurred due to the driver's operation.

Example of Functional Block

Figure 5:
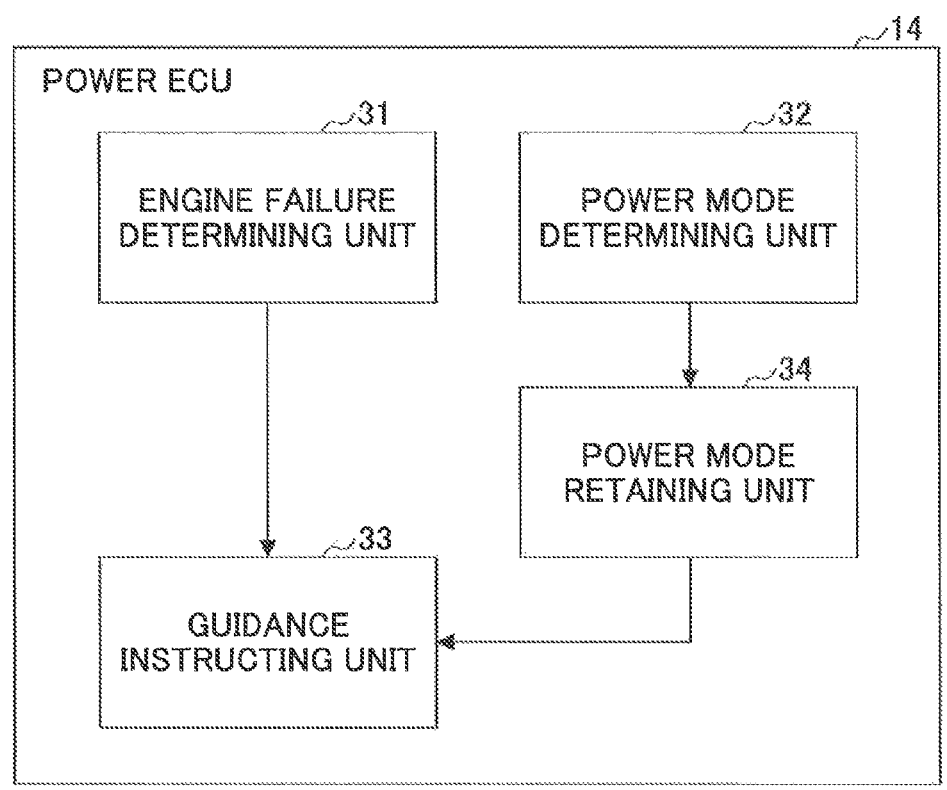
FIG. 5 is an example of a functional block diagram of the guidance device.

FIG. 5 is an example of a functional block diagram of the guidance device. The power ECU 14 includes an engine failure determining unit 31, a power mode determining unit 32, a power mode retaining unit 34, and a guidance instructing unit 33 (also referred to as a guidance processor). The power ECU 14 is a microcomputer including a CPU, a RAM, a ROM, an input output I/O, a CAN controller, etc., and therefore the above functions are realized as the CPU executes programs stored in the ROM and collaborates with the hardware mounted in the vehicle.

The engine failure determining unit 31 determines whether an engine failure has occurred while the vehicle is traveling. The engine failure determining unit 31 also determines whether a factor of the stopping of the engine or the stopping of the travelling system is a man-caused operation based on the power mode (hence the engine failure determining unit 31 may also be referred to as a stop factor determining unit or stop factor processor). An engine failure is caused by various factors such as when the vehicle runs out of gas or when a man-caused operation is performed (e.g., an emergency stop operation is performed by the driver). The stop factor processor 31 may determine which factor causes the stopping of the engine or the stopping of the travelling system. Regardless of the cause, the engine failure determining unit 31 determines that an engine failure has occurred while the vehicle is travelling. Note that vehicle is travelling means that when the vehicle speed is greater than or equal to a level that cannot be regarded as zero (for example, greater than a speed of 0 km/h).

When the vehicle is travelling, as described above, the power mode is the IG-ON mode (engine operating state), and therefore power is supplied to all devices mounted in the vehicle. Thus, the power ECU 14 can acquire signals from various sensors mounted in the vehicle, and can determine that the vehicle is travelling and that an engine failure has occurred. For example, the engine failure determining unit 31 can determine that the vehicle is travelling when the vehicle speed detected by the vehicle speed sensor is greater than a predetermined value. Furthermore, the engine failure determining unit 31 may determine that an engine failure has occurred when the engine revolution speed detected by the Ne sensor 26 has decreased to zero or to level that can be regarded as zero (hence Ne sensor 26 may also be referred to as a stop detecting unit or stop detector). Furthermore, it may be determined that an engine failure has occurred by acquiring an engine stop signal from the engine ECU 24. Therefore, for example, it can be detected that an engine failure has occurred while the vehicle is travelling, from the fact that the engine failure has occurred within a predetermined time since the vehicle speed has been acquired the last time. The engine failure determining unit 31 notifies the guidance instructing unit 33 that an engine failure has occurred while the vehicle is traveling.

As described above, the power mode determining unit 32 determines the power mode according to the pressing of the engine switch 11 (or the rotation position of the cylinder key), the shift position, and whether the brake pedal has been pushed down, and stores the determined power mode in the power mode retaining unit 34. As described above, according to the engine failure (engine stop), the power mode shifts from the IG-ON mode to the OFF mode, or from the IG-ON mode to the ACC mode; however, the power mode shifts to the ACC mode while the vehicle is travelling only when an emergency stop operation is performed. The power mode retaining unit 34 holds the present power mode as information such as the state of a flag.

When a notification that an engine failure has occurred while the vehicle is traveling is acquired, the guidance instructing unit 33 requests the meter ECU 18 to display a guidance according to the present power mode of the power mode retaining unit 34.

When the power mode is the IG-ON mode, the guidance instructing unit 33 requests the meter ECU 18 to display a message to immediately stop the vehicle.

The meter ECU 18 displays, on the liquid crystal display unit 30, a message such as "immediately evacuate the vehicle to the road shoulder".

When the power mode is the ACC mode, the guidance instructing unit 33 requests the meter ECU 18 to display a message to start the engine.

For example, in the case of the engine switch 11, the meter ECU 18 displays, on the liquid crystal display unit 30, a message such as "change the shift position to N and press the engine switch 11". In the as of the mechanical key, the meter ECU 18 displays, on the liquid crystal display unit 30, a message such as "change the shift position to N and turn the key to the START position". Other messages may be added, such as "an emergency stop operation has been performed while the vehicle is traveling (the engine switched has been pressed for over three seconds)" in the case of the engine switch 11, and "an emergency stop operation has been performed while the vehicle is traveling (the key has been turned to the ACC position)" in the case of the mechanical key.

Figure 6:
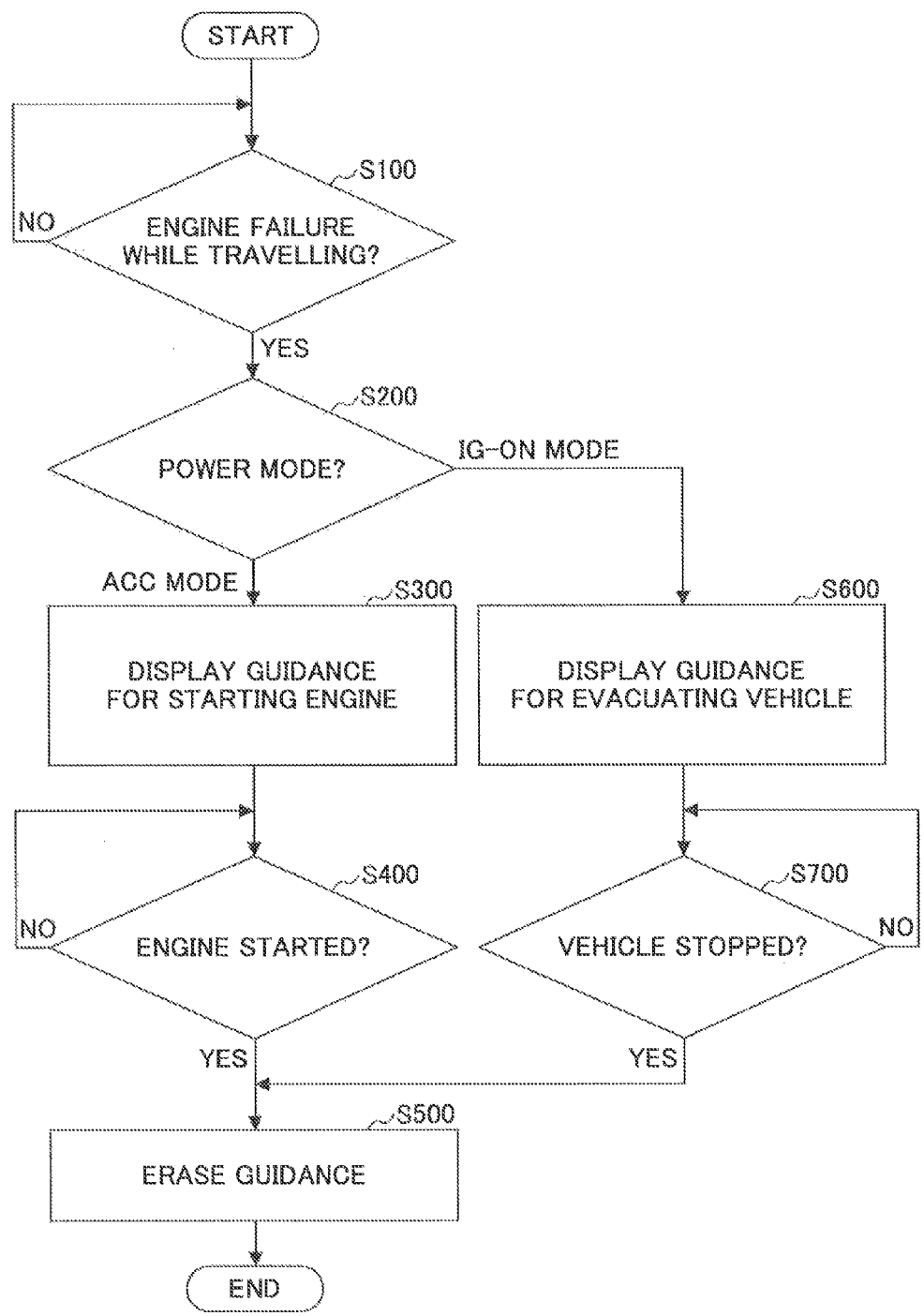
FIG. 6 is an example of a flowchart, for describing the outline of operational procedures of a guidance device.

Note that the meter ECU 18 may not only display the message, but may output a sound message from the speaker 21 to more effectively guide the method of starting the engine.
Operation Procedure FIG. 6 is an example of a flowchart for describing the outline of operational procedures of a guidance device. For example, the procedures of FIG. 6 start when the vehicle starts travelling.

The engine failure determining unit 31 detects that an engine failure has occurred while the vehicle is travelling (YES in S100). When the engine failure has been caused by an emergency stop operation, the power mode shifts to the ACC mode, and when she engine failure has been caused by other factors, the power mode is maintained at the IG-ON mode.

When it is determined that an engine failure has occurred while the vehicle is traveling, the guidance instructing unit 33 determines whether the power mode of the power mode retaining unit 34 is an ACC mode or an IG-ON mode (step S200).

When the power mode is the ACC mode, the guidance instructing unit 33 notifies the meter ECU 18 to display a guidance to start the engine. Accordingly, the meter ECU 18 displays a guidance to start the engine on the liquid crystal display unit 30 (S300).

The driver looks at the guidance and starts the engine. That is to say, in the case of the engine, switch 11, the driver presses the engine switch 11, and in the case of the mechanical key, the driver rotates the key to the IG position. It is necessary to push down the brake pedal to start the engine; however, the driver may hesitate to push down the brake pedal to avoid a rear-end collision while the vehicle is travelling by inertia. Thus, in the following cases, when it is detected that the engine switch 11 has been pressed or the mechanical key has been rotated to the IG position, regardless of whether the brake pedal is pushed down, the power ECU 14 turns on the IG1 relay 16 and the IG2 relay 17 while keeping on the ACC relay 15 (shift from ACC mode to IG-ON mode), and turns on the ST relay, to rotate the start motor and start the engine. Note that a request to push down the brake pedal may be made (described in message), or the starting of the engine may be allowed only after the vehicle has stopped.

In a case where an engine failure while the vehicle is traveling is detected, and the power mode is the ACC mode
In a case where a guidance to start the engine is displayed In the IG-ON mode, the power ECU 14 can detect the engine revolution speed and the vehicle speed, and therefore when the starting of the engine is detected (S400), the guidance instructing unit 33 requests the meter ECU 18 to erase the guidance. Accordingly, the meter ECU 18 erases the guidance (S500). In cases other than detecting the start of the engine, for example, when it is detected that the shift position has become P, the guidance may be erased. This is because when the shift position becomes P, it can be estimated that the vehicle speed is zero or near zero.

Meanwhile, when the power mode is the IG-ON mode, the guidance instructing unit 33 notifies the meter ECU 18 to display a guidance for evacuating the vehicle. Accordingly, the meter ECU 18 displays a guidance for evacuating the vehicle on the liquid crystal display unit 30 (S600).

In the IG-ON mode, the power ECU 14 can detect a signal of the vehicle speed, and therefore for example, when the vehicle speed becomes zero (S700), the guidance instructing unit 33 requests the meter ECU 18 to erase the guidance. Accordingly, the meter ECU 18 erases the guidance (S500).

MODIFICATION EXAMPLE

In FIG. 6, a guidance to start the engine is displayed when "engine failure while the vehicle is traveling is detected, and the power models the ACC mode"; however, the guidance to start the engine may be displayed when an emergency stop operation is detected.

Figure 7:
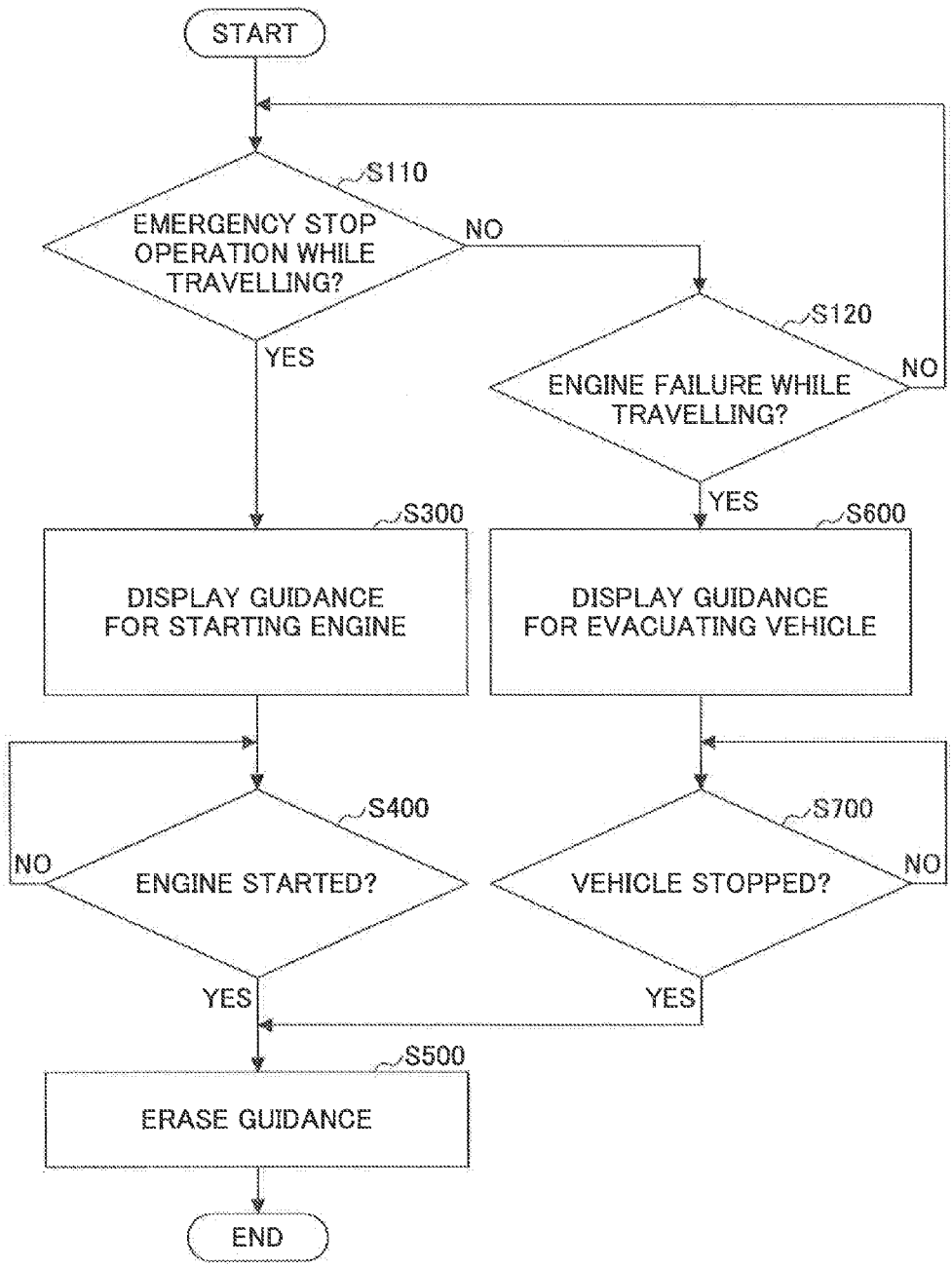
FIG. 7 is an example of a flowchart, for describing the outline of operational procedures of a guidance device.

FIG. 7 is an example of a flowchart for describing the outline of operational procedures of a guidance device. Descriptions of the steps in FIG. 7 that are the same as those of FIG. 6 are omitted. In FIG. 7, the engine fat lure determining unit 31 determines whether an emergency stop operation has been performed while the vehicle is traveling (S110). To the power ECU 14, the engine switch 11 and the key cylinder 28 are connected, and therefore the power ECU 14 can detect the emergency stop operation separately from other operations, so that it can be recorded that an emergency stop operation has been detected.

However, when an emergency stop operation is detected, the power ECU 14 keeps the ACC relay 15 on and turns off the IG1 relay 16 and the IG2 relay 17, and therefore the power mode becomes the ACC mode. Therefore, the power ECU 14 cannot detect vehicle speed signals, and cannot detect whether the vehicle is travelling. Accordingly, the engine failure determining unit 31 uses the vehicle speed signal acquired last. Vehicle speed information is used by many ECUs, and can therefore be acquired at relatively short time intervals. Thus, when the vehicle speed signal acquired last is greater than or equal to a predetermined value (for example, at several tens of km/h), the engine failure determining unit 31 can determine that the vehicle is travelling.

Next, the meter ECU 18 displays a guidance for starting the engine, and the driver looks at the guidance and starts the engine. In the procedures of FIG. 7, in the following cases, when it is detected that the engine switch 11 has been pressed or the mechanical key has been rotated to the IG position, regardless of whether the brake pedal is pushed down, the power ECU 14 turns on the IG1 relay 16 and the IG2 relay 17 while keeping on the ACC relay 15 (shift from ACC mode to IG-ON mode), and turns on the ST relay, to rotate the start motor and start the engine.

In a case where an emergency stop operation while the vehicle is traveling is detected (in a case where the operation is recorded)
In a case where a guidance to start the engine is displayed Note that when an emergency stop operation while the vehicle is travelling is not performed (NO in S110), the engine failure determining unit 31 determines whether an engine failure has occurred while the vehicle is traveling (S120). In this case, the engine failure is caused by factors other than an emergency stop operation, and therefore a guidance for evacuating the vehicle is displayed (S600). Subsequent procedures are the same as those of FIG. 6, and therefore descriptions thereof are omitted.

As described above, in a case where the engine failure is caused by the emergency stop operation, "a guidance for starting the engine" is provided, so that ever if the driver unintentionally performs the emergency stop operation, the driver can correctly recognize the state of the vehicle and, take appropriate measures.

Second Embodiment

FIG. 8 illustrates a schematic configuration of a guidance device according to the present embodiment. Descriptions of elements in FIG. 8 that are the same as those of FIG. 2 are omitted. The guidance device of FIG. 8 is a format corresponding to a HV vehicle or an EV vehicle. In the following, a HV vehicle is taken as an example, but the guidance device is also suitably applicable to an EV vehicle.

The guidance device of FIG. 8 includes a travelling system 40 including at least one electric motor. The at least one electric motor at least partially powers the vehicle. The guidance device of FIG. 8 includes a HV-ECU 29. When the power mode is the IG-ON mode (Ready-OFF state) described below, based on the accelerator position and the vehicle speed, the HV-ECU 29 refers to a map and determines the requested torque to be output to the drive shaft. Torque instruction values for distributing the requested torque to the engine and the motor are determined, so that the SOC of the battery is in an efficient range and the engine is driven efficiently. The torque instruction values are sent to the engine ECU 24 and the motor ECU, and at least one of the engine and the motor drives the vehicle.

Figure 9:
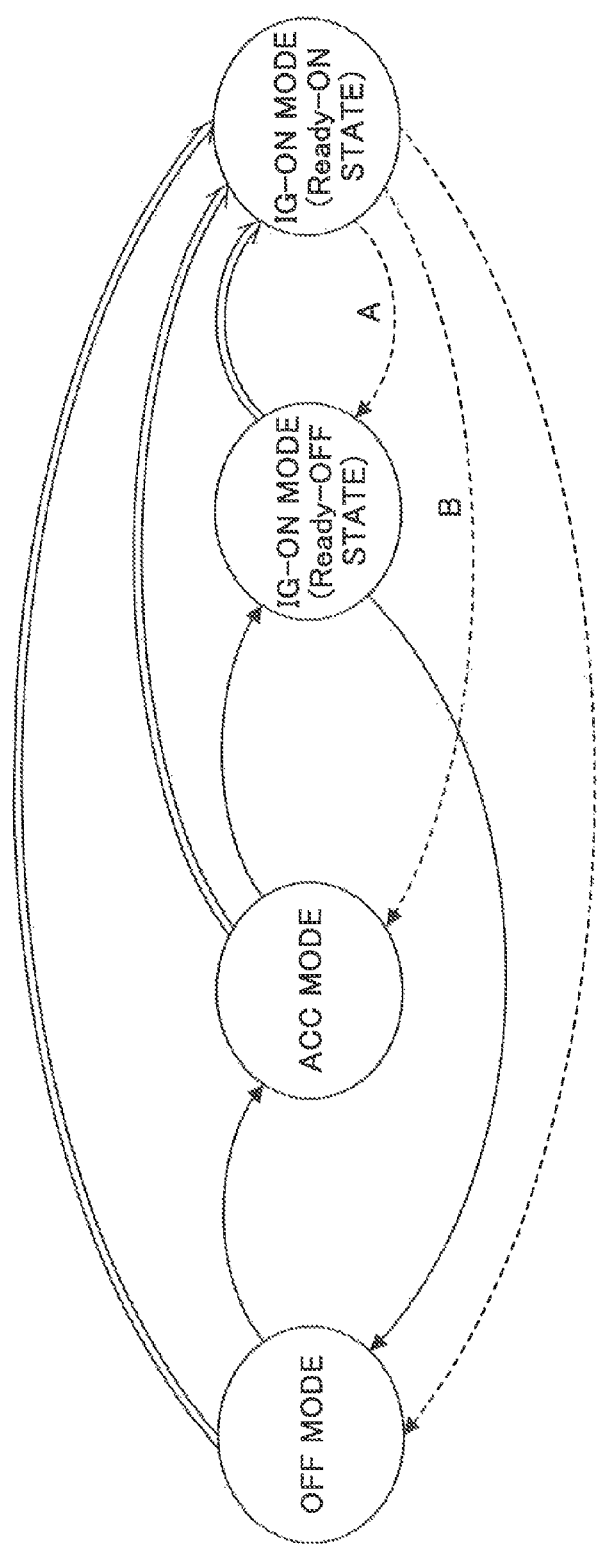
FIG. 9 illustrates examples of states of the power modes.

FIG. 9 illustrates an example of the power modes, in the case of a HV vehicle, as the power mode, there is an OFF mode, an ACC mode, and an IG-ON mode. There are two IG-ON modes, i.e., an IG-ON mode (Ready-OFF state) and an IG-ON mode (Ready-ON state).

The ACC mode and the OFF mode are the same as the first embodiment. The IG-ON mode (Ready-ON state) is a power mode by which the HV-ECU 29 is normally activated, and the vehicle can travel by engine traveling or motor travelling. The IG-ON mode (Ready-OFF state) is a power mode by which the HV-ECU 29 is not normally operating (for example, the ACC relay 15, the IG1 relay 16, and the IG2 relay 17 are turned on but the HV-ECU 29 is not outputting Ready-ON signals).

Transition of Power Mode when Ready-ON is Not Executed.

When the brake pedal is not pushed down, the power mode shifts every time the engine switch 11 is pressed
First time: OFF mode→ACC mode
Second time ACC mode→IG-ON mode (Ready-OFF State)
Third time: IG-ON mode (Ready-OFF state)→OFF mode That is to say, when the brake pedal is not pushed down, the power mode does not become the IG-ON mode (Ready-ON state).

Transition of Power Mode when Ready ON is Executed.

When the brake pedal is pushed down, the power mode may turn into the Ready-ON state from any power mode when the engine switch 11 is pressed once. It is described as "may" because there are cases where the power mode does not turn into the Ready-ON state on rare occasions. In a state where the brake pedal is pushed down and the engine switch 11 is pressed once, the power ECU 14 turns on the ACC relay 15, the IG1 relay 16, and the IG2 relay 17, and outputs activation signals to the HV-ECU 29. After being reset, the HV-ECU 29 reads programs and executes an initialization process and self-diagnosis, and determines whether it is in a state where activation is possible. Then, only when activation is possible, the HV-ECU 29 outputs Ready-ON signals to the power ECU 14, etc. The power ECU 14 receives the Ready-ON signals and turns into a Ready-ON state.
OFF mode→IG-ON mode (Ready-ON state)
ACC mode→IG-ON mode (Ready-ON state)
IG-ON mode (Ready-OFF state)→IG-ON mode (Ready-ON state)

In the Ready-ON state, the HV-ECU 29 starts the engine when it becomes a state where the engine is to be started. Thus, the power mode becomes the IG-ON mode (Ready-ON state) and an engine operating state, or the IG-ON mode (Ready-ON state) and an engine stop state.

Transition of Power Mode when Ready-OFF, etc.

In a case where the shift position is P and the vehicle is in a stopped state, regardless of whether the brake pedal is pushed down, the power mode becomes the OFF mode as the engine switch 11 is pressed once. The power ECU 14 turns of the ACC relay 15, the IG1 relay 16, and the IG2 relay 17, and therefore the HV-ECU 29, to which power is no longer supplied, executes a post process, and subsequently stops the executing of programs and the outputting of Ready-ON signals (hereinafter, simply referred to as Ready-OFF is executed). When the power ECU 14 cannot acquire Ready-ON signals, the power mode becomes the OFF mode. Whether or not the engine is operating does not affect the power mode.
IG-ON mode (Ready-ON state)→OFF mode Note that when the shift position is other than P, even when the vehicle is in a stopped state, the power mode only becomes the ACC mode as the engine switch 11 is pressed once.

Then, while the vehicle is travelling, when the engine switch 11 is pressed for more than a predetermined time length (for example, three seconds or more), the power ECU 14 shifts the power mode to the ACC mode (transition of B in figure). That is to say, the power ECU 14 keeps the ACC relay 15 on and turns off the IG1 relay 16 and the IG2 relay 17 and therefore the HV-ECU 29, to which power is no longer supplied, executes a post process, and subsequently stops the executing of programs and the outputting of Ready-ON signals. Therefore, the power ECU 14 turns into the ACC mode. The method of determining that the vehicle is travelling is the same as that of the first embodiment.

Long press (while travelling): IG-ON mode (Ready-ON state)→ACC mode

Meanwhile, when the HV-ECU 29 stops outputting Ready-ON signals without the driver's emergency stop operation, the power ECU 14 keeps on the ACC relay 15, the IG1 relay 16, and the IG2 relay 17. Therefore, the power mode shifts from the IG-ON mode (Ready-ON state) to the IG-ON mode (Ready-OFF state) (transition of A in the figure).

As described above, the power mode shifts from the IG-ON mode (Ready-ON state) to the ACC mode only when the driver presses the engine switch 11 for more than a predetermined time length while the vehicle, is travelling, so based on this, it can be detected that the HV-ECU 29 has become Ready-OFF due to the driver's operation.

Example of Functional Block

Figure 10:
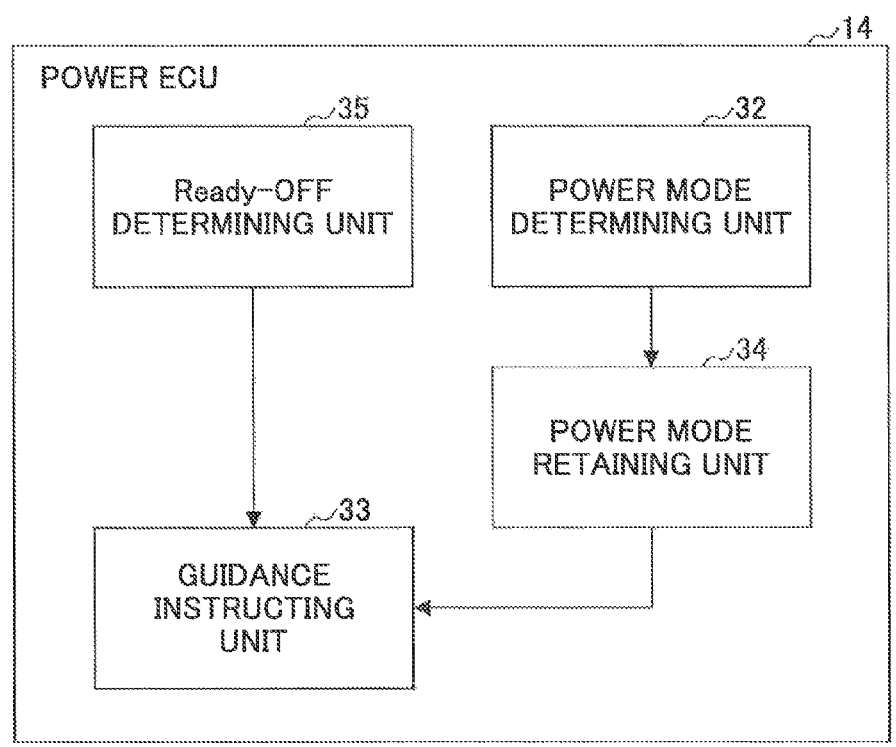
FIG. 10 is an example of a functional block diagram of the guidance device.

FIG. 10 is an example of a functional block diagram of the guidance device. Descriptions of elements in FIG. 10 that are the same as those of FIG. 5 are omitted.

A Ready-OFF determining unit 35 determines whether the HV-ECU 29 has stopped outputting Ready-ON signals (whether Ready-OFF is executed) while the vehicle is travelling. A case where Ready-OFF is executed while the vehicle is travelling is a case where the emergency stop operation is performed or an external operation is made to the vehicle or one of the ECUs, etc. The Ready-OFF determining unit 35 determines that Ready-OFF is executed while the vehicle is travelling, regardless of the cause. The method of determining that the vehicle is travelling is the same as that of the first embodiment. Furthermore, it is determined that Ready-OFF is executed when the HV-ECU 29 stops outputting Ready-ON signals.

The guidance instructing unit 33 determines the power mode when executing Ready-OFF. As described above, when the HV-ECU 29 becomes Ready-OFF, the power mode shifts from the IG-ON mode (Ready-ON state) to the IG-ON mode (Ready-OFF state), or from the IG-ON mode (Ready-ON state) to the ACC mode; however, the power mode shifts to the ACC mode while the vehicle is traveling only when the emergency stop operation is performed.

When a notification that Ready-OFF is executed while the vehicle, is traveling is received, the guidance Instructing unit 33 requests the meter ECU 18 to display the guidance, according to the present power mode of the power mode retaining unit 34.

Figure 11:
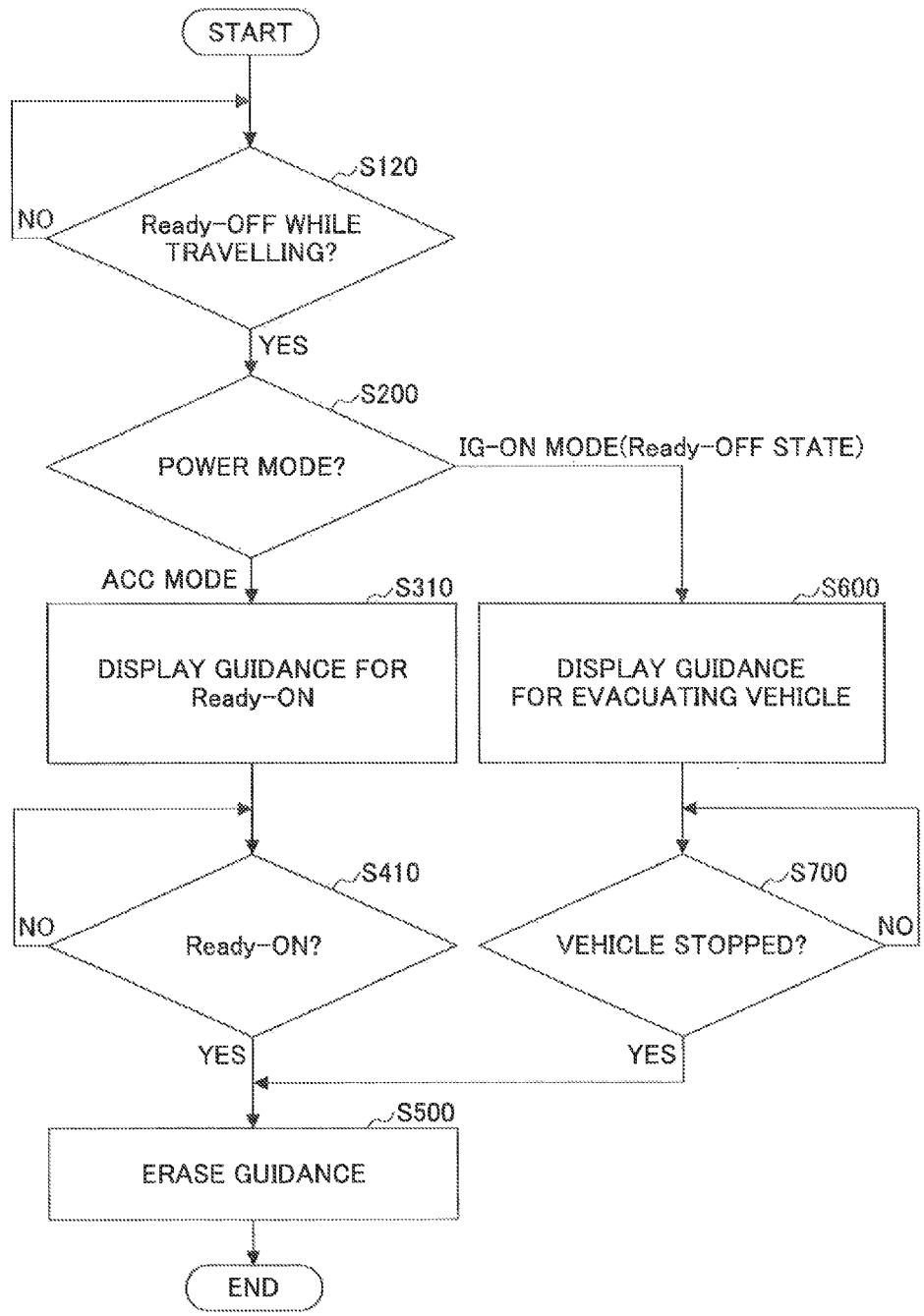
FIG. 11 is an example of a flowchart for describing the outline of operational procedures of a guidance device.

When the power mode is the IG-ON mode (Ready-OFF state), the guidance instructing unit 33 requests the meter ECU 18 to display a message to immediately stop the vehicle When the power mode is the ACC mode, the guidance instructing unit 33 requests the meter ECU 18 to display a message to execute Ready-ON Operation Procedure FIG. 11 is an example of a flowchart for describing the outline of operational procedures of a guidance device. Descriptions of FIG. 11 that are the same as those of FIG. 6 are omitted. First, the Ready-OFF determining unit 35 detects that Ready-OFF is executed while the vehicle is traveling (YES in S120). When Ready-OFF has been executed by an emergency stop operation, the power mode shifts to the ACC mode, and when Ready-OFF has been executed by other causes, the power modes shifts to the IG-ON mode (Ready-OFF state).

When it is determined that Ready-OFF is executed while the vehicle is travelling, the guidance instructing unit 33 determines whether the power mode of the power mode retaining unit 34 is the ACC mode or the IG-ON mode (Ready-OFF state) (S200).

When the power mode is the ACC mode, the guidance instructing unit 33 notifies the meter ECU 18 to display a guidance to execute Ready-ON. Accordingly, the meter ECU 18 displays a guidance to execute Ready-ON on the liquid crystal display unit 30 (S310). As the guidance, a message such as "change the shift position to N and press the engine switch 11" is displayed.

The driver looks at the guidance and presses the engine switch 11. In the following cases, when it is detected that the engine switch 11 has been pressed, regardless of whether the brake pedal is pushed down, the power ECU 14 shifts the bower mode from the ACC mode to the IG-ON mode (Ready-ON state) and outputs activation signals to the HV-ECU 29, so that the HV-ECU 29 outputs Ready-ON signals.

Ready-OFF while the vehicle is travelling is detected, and the power mode is the ACC mode A guidance for Ready-ON is displayed.

When the power mode is the IG-ON mode (Ready-ON state) (YES in S410), the guidance instructing unit 33 requests the meter ECU 18 to erase the guidance based on the Ready-ON signals. Accordingly, the meter ECU 18 erases the guidance (S500). Note that the process when the power mode is the IG-ON mode (Ready-OFF state) is the same as that of the first embodiment.

Furthermore, although not illustrated, similar to the first embodiment, "an emergency stop operation while the vehicle is travelling" may be detected and the display contents of the guidance may be switched.

As described above, when the Read-OFF is caused by an emergency stop operation, "a guidance to execute Ready-ON" is also provided, so that even when the driver has unintentionally performed the emergency stop operation, the driver can correctly recognize the state of the vehicle and take appropriate measures.

The invention claimed is:

1. A guidance device for teaching a vehicle operating method, the guidance device comprising:
    an operation receiver configured to receive an operation of starting or stopping an engine, or to receive an operation of starting or stopping a travelling system including at least an electronic motor;
    a power controller configured to control a defined power mode according to the operation received by the operation receiver and a state of a vehicle;
    a stop detector configured to detect stopping of the engine or stopping of the travelling system, while the vehicle is travelling;
    a stop factor processor configured to determine whether a factor of the stopping of the engine or the stopping of the travelling system is a man-caused operation based on the power mode; and
    a guidance processor configured to provide a guidance content according to whether the factor is the man-caused operation,
    wherein when the factor is the man-caused operation, the guidance processor is configured to provide the guidance to instruct the driver to start the engine or execute a Ready-ON operation by operating a switch for activating the travelling system, and
    wherein when the factor is not the man-caused operation, the guidance processor is configured to provide the guidance to instruct the driver to evacuate the vehicle from a roadway.

2. The guidance device according to claim 1, wherein
    the guidance processor provides a guidance for starting the engine, when the power mode is set to provide power to a first device, which is not necessary for travelling, as a power supply destination, and
    the guidance processor provides a guidance for occupants of the vehicle to evacuate the vehicle from the roadway, when the power mode is set to provide power to a second device, which is necessary for travelling, as the power supply destination.

3. The guidance device according to claim 1, wherein
    the guidance processor provides a guidance by causing a display device to display a message.

4. The guidance device according to claim 1, wherein
    the guidance processor provides a guidance by causing a speaker to output a sound of a message.

5. A guidance method of a guidance device for teaching a vehicle operating method, the guidance method comprising:
    receiving an operation of starting or stopping an engine, or receiving an operation of starting or stopping a travelling system including at least an electronic motor;
    controlling a defined power mode according to the received operation and a state of a vehicle;
    detecting stopping of the engine or stopping of the travelling system while the vehicle is travelling;
    determining whether a factor of the stopping of the engine or the stopping of the travelling system is a man-caused operation based on the power mode; and providing a guidance content according to whether the factor is the man-caused operation, wherein when the factor is the man-caused operation, providing the guidance content includes instructing the driver to start the engine or execute a Ready-ON operation by operating a switch for activating the travelling system, and wherein when the factor is not the man-caused operation, providing the guidance content includes instructing the driver to evacuate the vehicle from a roadway.

* * * * *